United States Patent [19]

Muramatsu et al.

[11] Patent Number: 5,142,522
[45] Date of Patent: Aug. 25, 1992

[54] LOCKING MECHANISM USEFUL FOR FLOATING UNIT OF AUTOMOBILE CD PLAYER

[75] Inventors: Hidenori Muramatsu; Hideyo Ishikawa; Kazuki Takai, all of Saitama, Japan

[73] Assignee: Clarion Co., Ltd., Tokyo, Japan

[21] Appl. No.: 670,777

[22] Filed: Mar. 19, 1991

[30] Foreign Application Priority Data

Mar. 13, 1990 [JP] Japan .................................. 2-71952

[51] Int. Cl.⁵ ...................... G11B 33/02; G11B 17/00; G11B 23/00; H04K 1/06
[52] U.S. Cl. ................................ 369/75.2; 369/75.1; 369/247; 369/270; 455/345; 455/346
[58] Field of Search .................... 369/75.1, 75.2, 77.1, 369/77.2, 258, 270, 247; 360/99.02, 99.06; 455/345, 346

[56] References Cited

U.S. PATENT DOCUMENTS 4,727,444 2/1988 Fukushima et al. ................ 369/75.2
4,979,161 12/1990 Verhagen ...................... 369/75.1 X

FOREIGN PATENT DOCUMENTS 0148553 7/1985 European Pat. Off. .......... 369/75.1

*Primary Examiner*—Stuart D. Levy
*Assistant Examiner*—Tan Nguyen
*Attorney, Agent, or Firm*—Wegner, Cantor, Mueller & Player

[57] ABSTRACT

A locking mechanism comprises a chassis, a floating unit supported movably by the chassis through the intermediary of a damper, a shift plate provided in the chassis and movable by a drive power of a motor, a link mechanism cable of rotational movement by the movement of the shift plate, and a lock plate movable by the link mechanism. The shift plate has a first lock part movable in a first direction, the link mechanism has a second lock part movable in a second direction perpendicular to the first direction, and the lock plate has a third lock part movable in the first direction. The floating unit has first, second and third engaging parts for engaging the first, second and third lock parts, respectively, to limit the movement of the floating unit. A mechanism for limiting the vertical movement of the floating unit is provided in at least one of combinations of the first, second and third lock parts with the first, second and third engaging parts.

6 Claims, 9 Drawing Sheets

LOCKING MECHANISM USEFUL FOR FLOATING UNIT OF AUTOMOBILE CD PLAYER

BACKGROUND OF THE INVENTION

This invention relates to impact absorbing floating units movably supported through the intermediary of damper means, for example, on a chassis of a compact disk (CD) player mounted on a vehicle, and more particularly to a locking mechanism for locking the floating unit to the chassis.

Generally, a CD player for mounting on a vehicle needs to be protected from the running vibrations of the vehicle. If running vibration is applied to the sound reproduction (playback) mechanism of a CD play er, the pickup would run off the track on the CD and the sound would skip. Since the reproduction mechanism including the pickup is a precision machine, it may be damaged by an extraordinary impact.

In order to prevent such a problem, component members of the reproduction mechanism, (such as the pickup, its feed mechanism, a turntable for supporting a CD, and its driving motor in CD players for mounting on a vehicle) are mounted on a floating unit, which is supported movably to the chassis through the intermediary of damper means such as a damper spring or a rubber vibration insulator.

When vibrations are transmitted to the chassis of a CD player having such a floating unit, they would be absorbed by the damper spring or the rubber vibration insulator. Therefore, the vibrations of the traveling vehicle are not transmitted to the floating unit, thereby preventing a sound skip or an adverse effect on the reproduction mechanism.

An ordinary CD player for mounting on a vehicle has the following structure. When a CD is inserted manually into an opening provided in the chassis, it is loaded into the chassis by transfer means provided at the opening. The CD loaded into the chassis is stopped by a positioning mechanism, which is provided in the chassis at a position where the center of the CD coincides with the center of the turntable of the floating unit. When the CD stops above the turntable, clamping means come from above and from below and secure the CD to the turntable.

With CD players for mounting on a vehicle, a CD ejected from inside the chassis can be set in the opening of the chassis without being removed from the player. This is called the waiting state. Only by lightly pushing the CD set at the opening into the chassis, is the CD put into the reproducing position.

However, with a CD player for mounting on a vehicle, the floating unit bearing the turntable and the clamping mechanism is supported movably to the chassis. Under this condition, there may occur a shift in position between the floating unit and the opening, the transfer means, and the CD positioning mechanism on the chassis side.

As a result, when a CD is inserted, the opening may not coincide in position with the turntable, so that there is a possibility that the CD will be unable to be inserted or the CD will impinge on the floating unit and get damaged. Misalignment may occur between the stop position of the CD brought in by the transfer means and the position of the turntable, making clamping of the CD impossible. A similar irregularity occurs also when the CD is ejected. If there is positional misalignment between the turntable and the opening, the CD cannot be ejected. When the CD is in the waiting state, the front of the CD is located at the chassis and its rear at the floating unit. Therefore, the CD may get damaged when the floating unit moves.

Accordingly, when the CD is inserted, ejected or put in the waiting state, the floating unit must be locked at a position where the floating unit coincides with the opening of the chassis.

As a mechanism for locking the floating unit, a type of locking mechanism is used which regulates the position of the floating unit in the vertical, front-rear and left-right directions. More specifically, the regulation of the vertical direction is necessary to transfer a CD between the turntable and the clamping means. The regulation in the front-rear direction is necessary to keep constant the relative positional relationship between the positioning mechanism on the chassis side and the floating unit at all times to enable the CD to be stopped accurately at the center of the turntable. In addition, the regulation in the left-right direction is necessary to accurately position the CD and the turntable by the positioning mechanism, and to securely lock the floating unit to the chassis.

With CD players, the floating unit must be of a proper size (in terms of flat area) for mounting a CD thereon. In this case, even if only the front of the floating unit is locked, the rear side is left unlocked, causing a positional misalignment to occur between the floating unit and the chassis. Even if either the left or right side only of the floating unit is locked, the other side is not fixed, so that the floating unit is inclined left or right, thus causing a positional misalignment between the floating unit and the chassis.

Therefore, in order to lock the floating unit, it is necessary to lock the whole floating unit in a horizontal position relative to the chassis in addition to being locked in the front-rear, left-right and vertical directions. This means that the floating unit is locked at various positions around its periphery.

However, in order that the floating unit is locked in the vertical, front-rear and left-right directions and at various positions around its periphery, the locking mechanism must have many component parts. It is to be noted particularly that conventionally, special-purpose locking members have been provided for locking in the respective directions and that links disposed between a drive source (normally, a motor for insertion and ejection of a CD) for driving the locking members in different directions and the locking members have been provided in the respective directions. Therefore, many components making up the locking mechanism as necessary, thereby leading to a complexity of assembly of the locking mechanism, with the result that the production cost increases, which is economically disadvantageous.

This problem generally exists not only with CD players for mounting on a vehicle but with devices, having a floating unit supported to the chassis through the intermediary of damper means, for locking the floating unit to the chassis when necessary, some examples of which devices are other acoustic apparatuses, video apparatuses, and precision apparatuses in general, including measuring instruments required to have vibration insulating characteristics for mounting on a vehicle.

SUMMARY OF THE INVENTION

This invention has been proposed to solve the problems of the prior art.

An object of this invention is to provide a locking mechanism for the floating unit for secure locking with a reduced number of components.

Another object of this invention is to provide a locking mechanism for locking the floating unit without inclination to left or right by transmitting the drive power of a member driven by a motor to the front, right and left of the floating unit.

A further object of this invention is to provide a locking mechanism for locking the whole floating unit horizontally to the chassis at three locking positions, namely, at the front, left rear and right rear of the floating unit.

A still further object of this invention is to provide a locking mechanism for regulating the position of the floating unit in the vertical direction by the use of a simple construction including a contrivance in the shape of the lock member.

Yet another object of this invention is to provide a locking mechanism for the floating unit for smooth reception and ejection of a CD and accurate positioning of a CD at the reproduction position in a CD player having an opening for receiving a CD and transfer means provided in the chassis and a reproduction mechanism including a turntable and a pickup provided in the floating unit.

In order to solve the above-mentioned problems, the locking mechanism according to this invention comprises a chassis, a floating unit supported movably to the chassis through the intermediary of damper means, a shift plate provided in the chassis and movable by the drive power of a motor, a link mechanism rotatable by the movement of the shift plate, and a lock plate movable by the link mechanism.

A first lock part movable in a first direction is provided in the shift plate, a second lock part movable in a second direction perpendicular to the first direction is provided in the link mechanism, a third lock part movable in the first direction is provided in the lock plate. First, second and third engaging parts for limiting the movement of the floating unit by engagement with the first, second and third lock parts are provided in the floating unit. In at least one of combinations of the first, second and third lock parts with the first, second and third engaging parts, means for limiting the vertical movement of the floating unit is provided.

In the inventive locking mechanism having such arrangement, the floating unit is normally supported movably to the chassis through the intermediary of damper means, so that no impacts or vibrations applied to the chassis are transmitted to the floating unit. As a result, damage to precision devices such as the pickup of a CD provided on the floating section or a functional defect like a sound skip can be prevented.

Assume that the floating section is locked. As the shift plate is driven in a first direction by a motor, the link mechanism connected to the shift plate is moved in a second direction, and the lock plate interlocked with the link mechanism is moved in the first direction. Consequently, the first, second and third lock parts provided on those members engage with the first, second and third engaging parts of the floating section. At this time, the first and third lock parts and engaging parts prevent the floating unit from moving in the front-rear direction, for example, and the second lock parts and engaging parts prevent the floating unit from moving in the left-right direction, for example. Vertical position limiting means provided on at least one of those combinations of the lock parts with the engaging parts prevents the floating unit from moving in the vertical direction. In consequence, the floating unit is unable to move in any of the vertical, left-right, and front-rear directions, and is locked securely to the chassis in a fixed position.

Therefore, with a CD player to which this invention is applied, the relative positional relationship between the opening for receiving a CD, CD transfer means, and CD positioning means provided on the chassis side and the turntable on the floating section side is determined accurately at all times. Accordingly, a CD which has been transferred does not impinge on the members on the floating unit side, and the CD is loaded and ejected smoothly, thereby eliminating damages to the CD during loading or ejection. The positional relationship between the positioning mechanism and the turntable is maintained constant at all times, so that the CD is positioned at the center of the turntable.

BRIEF DESCRIPTION OF THE DRAWINGS

FIGS. 1 to 3 are a plan view showing an embodiment of a locking mechanism for the floating unit according to this invention wherein FIG. 1 shows the unlocked floating unit;

FIG. 2 shows the floating unit in the course of being locked; and

FIG. 3 shows the locked floating unit;

FIGS. 5 to 7 each are a right side view of the embodiment of FIGS. 1 to 3 wherein FIG. 5 shows the unlocked floating unit;

FIG. 6 shows the floating unit in the course of being locked; and

FIG. 7 shows the locked floating unit;

FIGS. 8 to 10 each are a left side view of the embodiment of FIGS. 1 to 3 wherein FIG. 8 shows the unlocked condition of the floating unit;

FIG. 9 shows the floating unit in the course of being locked; and

FIG. 10 shows the locked floating unit;

DETAILED DESCRIPTION OF THE INVENTION

An embodiment of a locking mechanism for the floating unit according to this invention will be described with reference to the accompanying drawings. This embodiment includes the chassis of a CD player and the floating unit supported to the chassis through the intermediary of damper means. In this embodiment, a first direction in which the shift plate moves corresponds to the front-rear direction (the vertical direction in FIG. 1) of a CD player, while a second direction corresponds to the left-right direction (the left-right direction in FIG. 1) of the CD player. In the plan views of FIGS. 1 to 3, the front side of the CD player is located in the lower section of these figures, while the rear side is located in the upper section of these figures. With regard to the shift plate and the lock plate, their parts located in the lower and upper sections of this drawing are called the front and rear parts, respectively.

Figure 1:
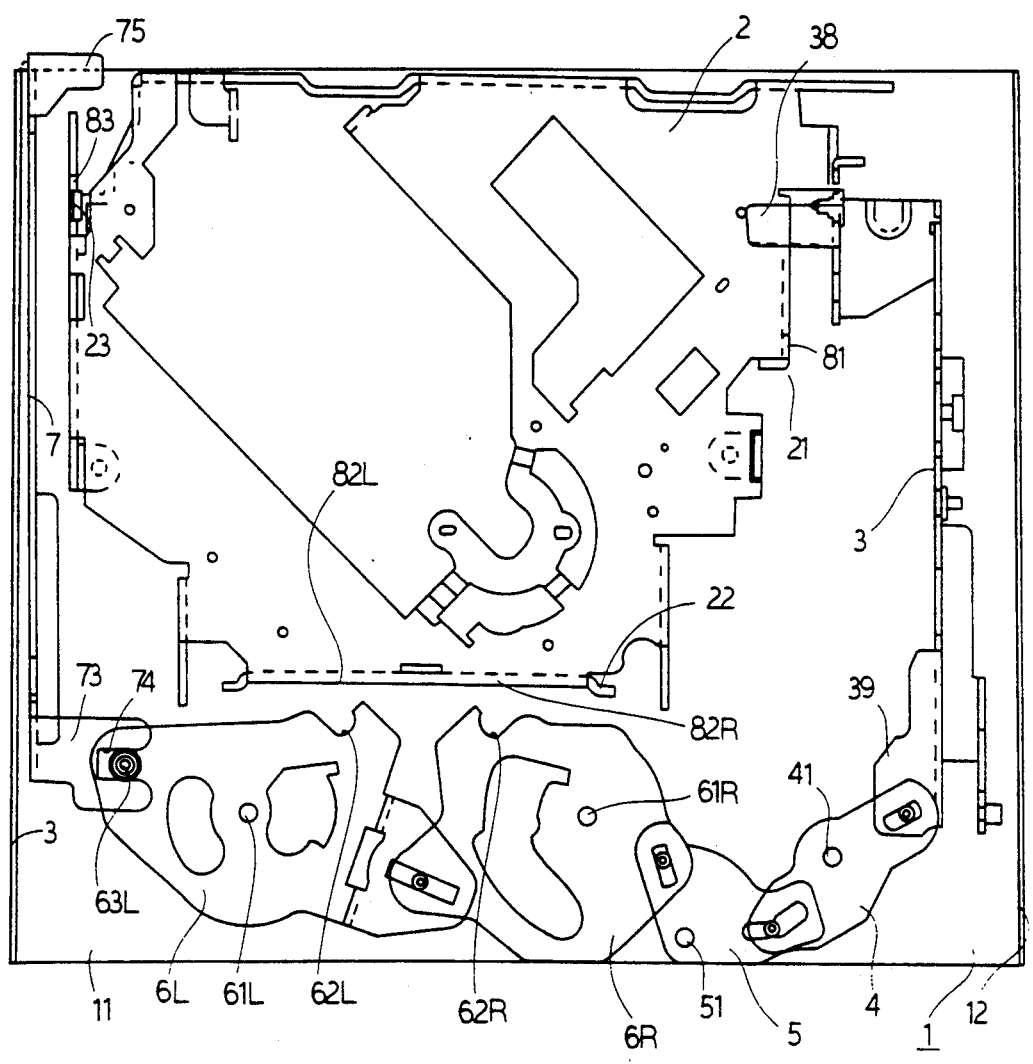

FIG. 1 is a plan view of this embodiment, and a chassis 1 of the CD player is indicated by a thin line. This chassis 1 is a hollow box-shaped member, and contains a floating unit 2. The floating unit 2 has mounted thereon a reproduction mechanism (not shown) including a turntable and a pickup of the CD player. The reproduction mechanism is omitted from FIG. 1 because it can appropriately be selected according to the type of a CD player mounted. The floating unit 1 is supported movably to the chassis 1 by damper means. More specifically, when a CD is played back, the flqating unit is supported in a floating condition at a position separated from the chassis. Because the damper means of the floating unit in the CD player is well-known, it is omitted in FIG. 1, but damper means of a construction that the floating unit 2 is suspended over the chassis 1 by a coil spring and a rubber damper is generally used.

The chassis 1 comprises a flat bottom plate 11 and a pair of right and left upright side plates 12, 13. The floating unit 2 is disposed above the bottom plate 11 between the right and left side plates 12, 13.

Figure 11:
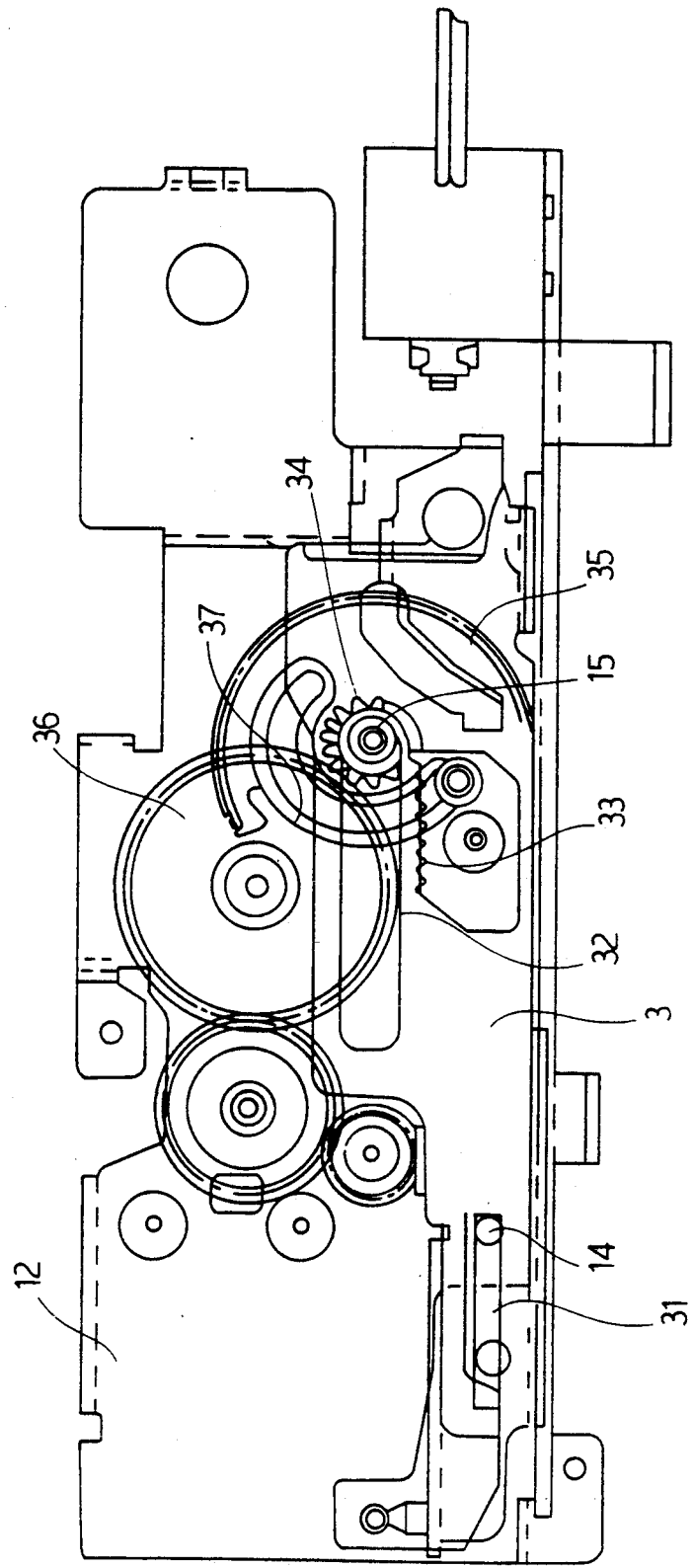
FIG. 11 is a right side view showing an embodiment of the shift plate drive means provided in the embodiment of FIG. 1.
Figure 12:
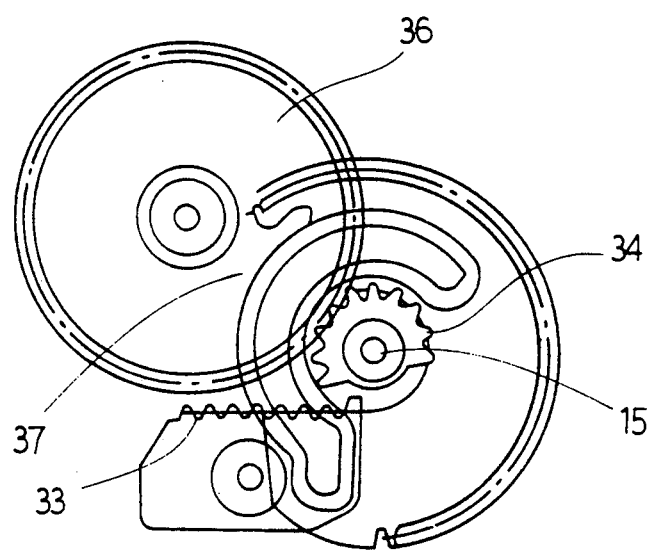
FIG. 12 is an enlarged view of the drive gear of FIG. 11.

As shown in FIG. 1, a shift plate 3 is provided on the right side of the floating section 2. This shift plate 3 is an upright plate member provided parallel to the side plates of the chassis 1. As shown in FIG. 11, the shift plate 3 is supported movably in the front-rear direction (the vertical direction in FIG. 1) relative to the chassis 1 by pins 14, 15 provided on the side plate 12 of the chassis 1 and inserted slidably in guide holes 31, 32 provided therein. On the side surface of the shift plate, there is provided a rack 33 extending in the front-rear direction. A pinion 34 fitted on pin 15 engages with the rack 33. Pinion 34 rotates as a unit together with an intermittent coaxial gear 35. This intermittent gear 35 engages with a drive gear 36 which is rotated by a motor (not shown). The intermittent gear 35 has a notch 37 without gear teeth, and the notch 37 to which the torque of the drive gear 36 cannot be transmitted, thereby causing the intermittent gear 35 to stop.

The intermittent gear 35 has means for causing the intermittent gear 35, which has stopped after disengagement from the drive gear 36, to engage with the drive gear 36 again. This means is not shown, but any of various known types of mechanisms may be adopted for this purpose. For example, such a type of means may be adopted which causes the intermittent gear 35 to rotate up to the position where it engages with the drive gear 36 by using an electromagnetic plunger operated by a signal for stopping the reproducing operation of the CD player.

Figure 4:
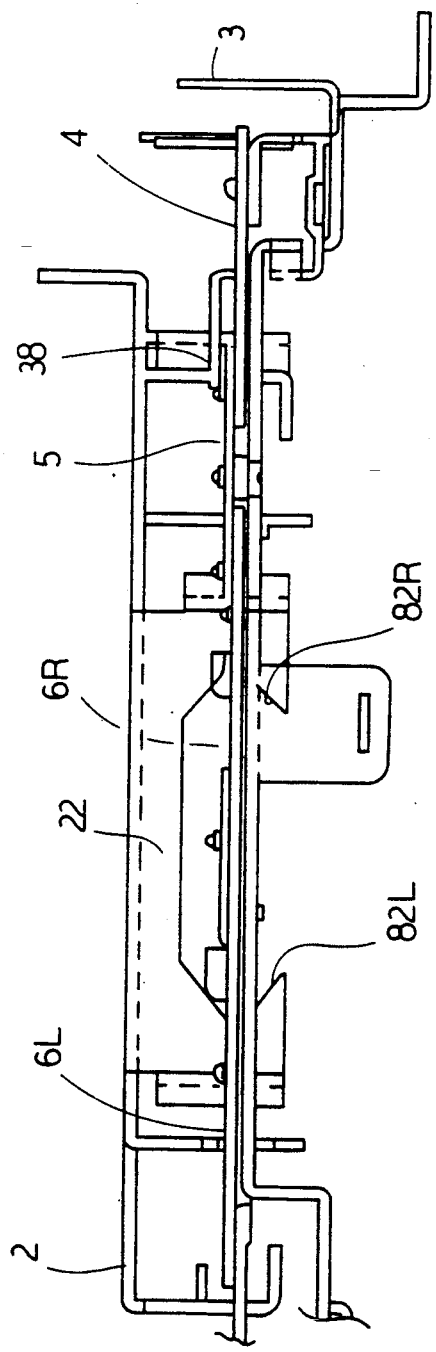
FIG. 4 is a front view of the locked floating unit in the embodiment of FIGS. 1 to 3.

As shown in FIGS. 1 and 4, there is formed a first lock part 38 protruding toward the rear part of the floating unit 2 on the rear end of the shift plate 3. The first lock part 38 is a plate member having a fixed width and a fixed thickness and located horizontally with respect to the chassis 1.

As shown in FIG. 1, there is provided a link mechanism connected to the front end of the shift plate 3 in front of the floating unit 2. The link mechanism comprises links 4, 5, connected rotatably, for transmitting the drive power, and right and left lock links 6R, 6L for locking the floating unit 2. The links 4, 5, 6R, 6L are made of plates provided parallel to the chassis 1, and are mounted rotatably to the chassis 1 through shafts 41, 51, 61R, 61L provided on the chassis. A horizontal part 39 is provided at the front end of the shift plate 3. At the ends of the horizontal part 39 and the links 4, 5, 6R, 6L, there are provided pins and guide holes in which the pins are inserted. Therefore, the shift plate 3 and the links 4, 5, 6R, 6L are connected together by those pin and guide hole mechanisms. As the shift plate 3 moves in the front-rear direction, the shift plate-connected links are moved sequentially, so that the right and left lock links 6R, 6L move in the right and left opposite directions.

In the lock links 6R, 6L, there are second lock parts 62R, 62L in the regions rotating outward from the center of the floating unit 2. Those lock parts 62R, 62L are in a hooked form with their inner sides curved in a circular arc.

Figure 8:
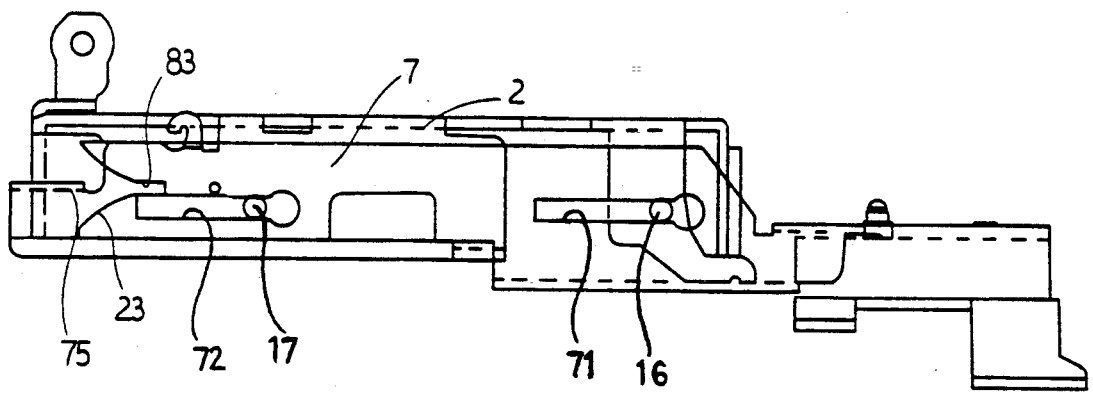
Figure 9:
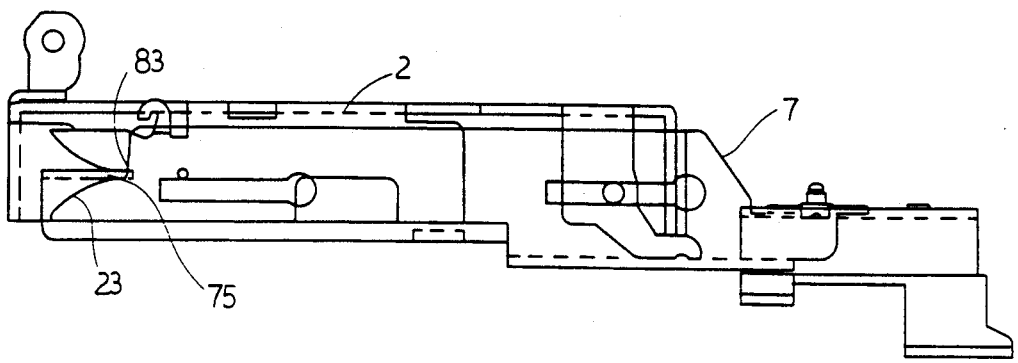
Figure 10:
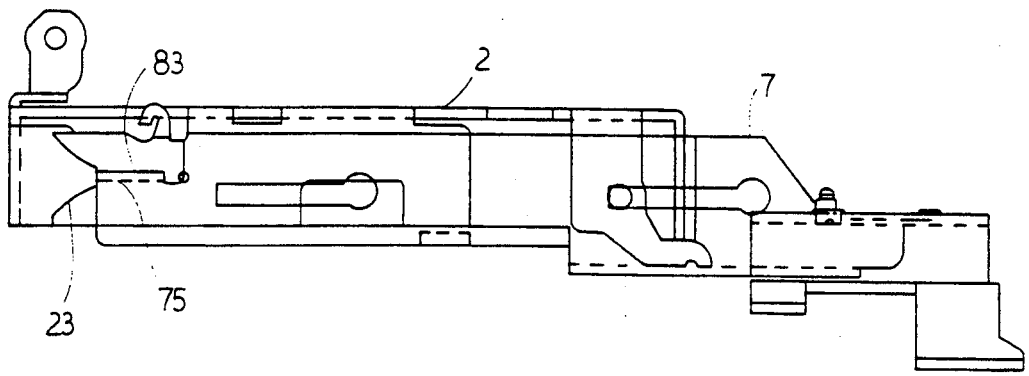

As shown in FIG. 1, a lock plate 7 extending in the front-rear direction is provided on the left side of the floating unit 2. This lock plate 7 is a vertical plate member arranged parallel to the side plate 13 on the left side of the chassis. In the lock plate 7 as shown in FIG. 8, there are provided guide holes 71, 72 extending in the front-rear direction, through which the pins 16, 17 on the chassis side are inserted. Therefore, the lock plate 7 is supported movably in the front-rear direction relative to the chassis 1. As shown in FIG. 1, the lock link 6L constituting the leftmost part (opposite the shift plate 3) of the link mechanism is connected to the lock plate 7. More specifically, a horizontal part 73 is provided at the front end of the lock plate 7. A pin 63L provided at the left-side end of the lock link 6L engages in a guide groove 74 provided in the horizontal part 73.

As shown in FIGS. 1 and 8, at the rear end of the lock plate 7, a third lock part 75 is formed which protrudes towards the rear part of the floating unit 2. This third lock part 75 is a plate member having a fixed width and a fixed thickness and located horizontally with respect to the chassis 1.

Figure 5:
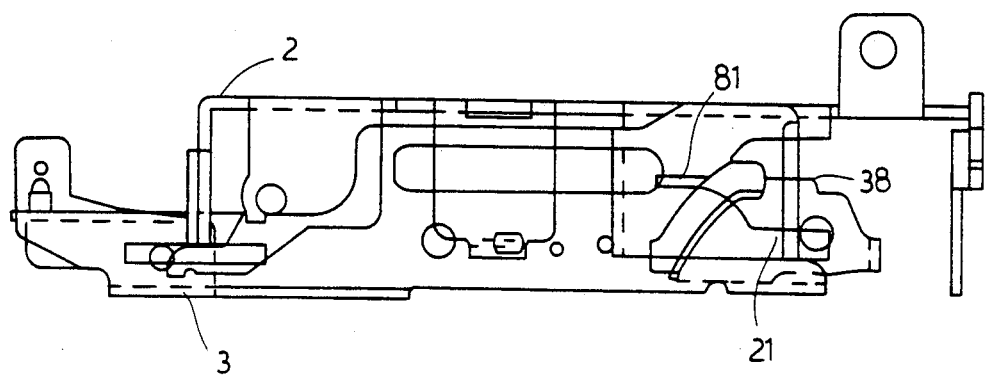
Figure 6:
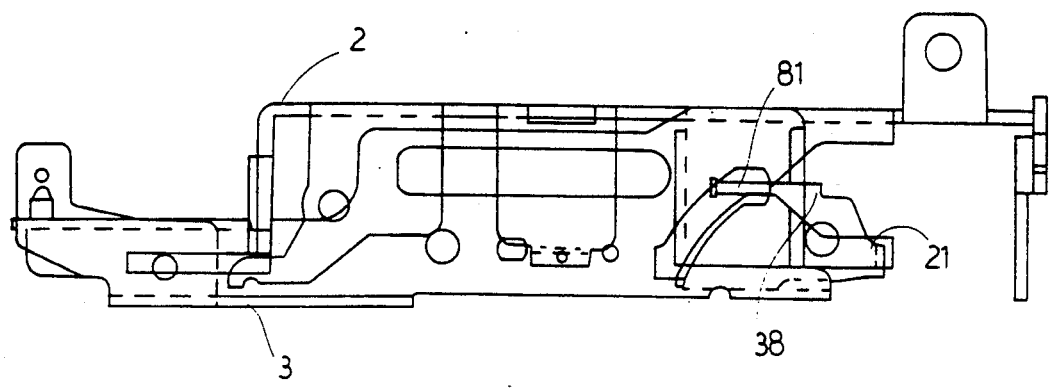
Figure 7:
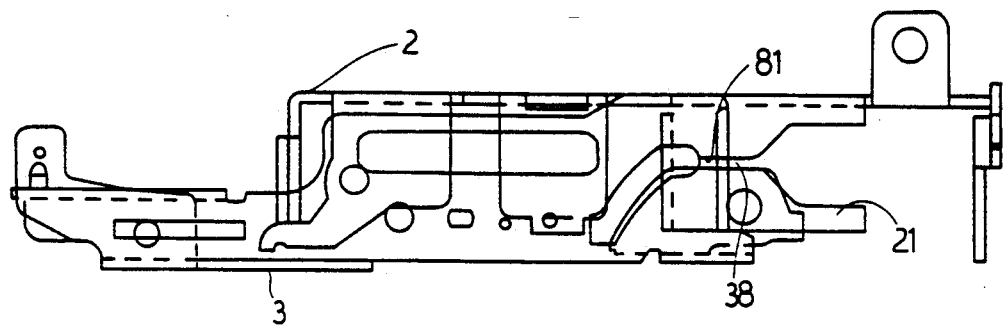

As shown in FIGS. 1 and 5, an upright plate member 21 is provided at the right-side rear of the floating unit 2. This plate member 21 has a first engaging part 81 with which the first lock part 38 engages from the rear of the chassis 1.

Figure 2:
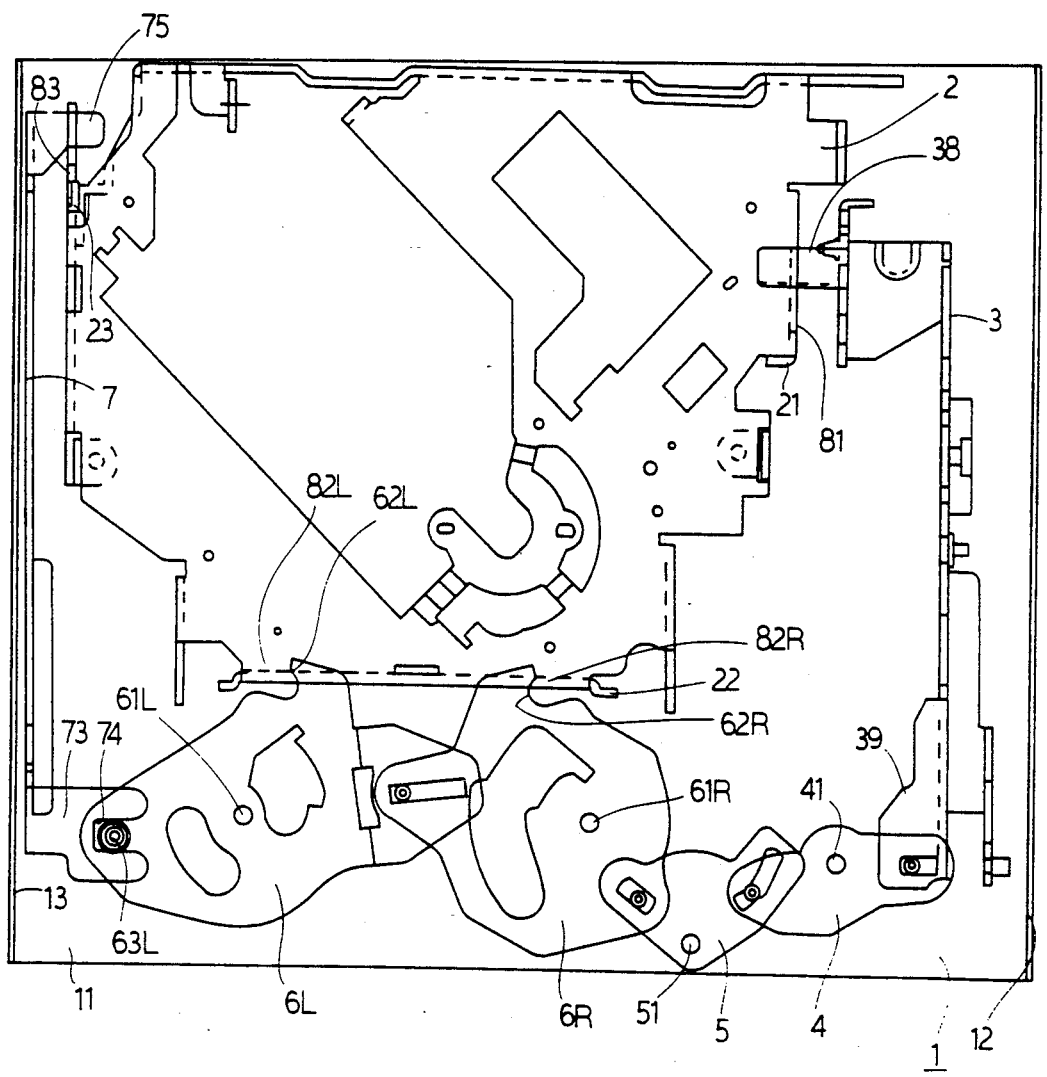
Figure 3:
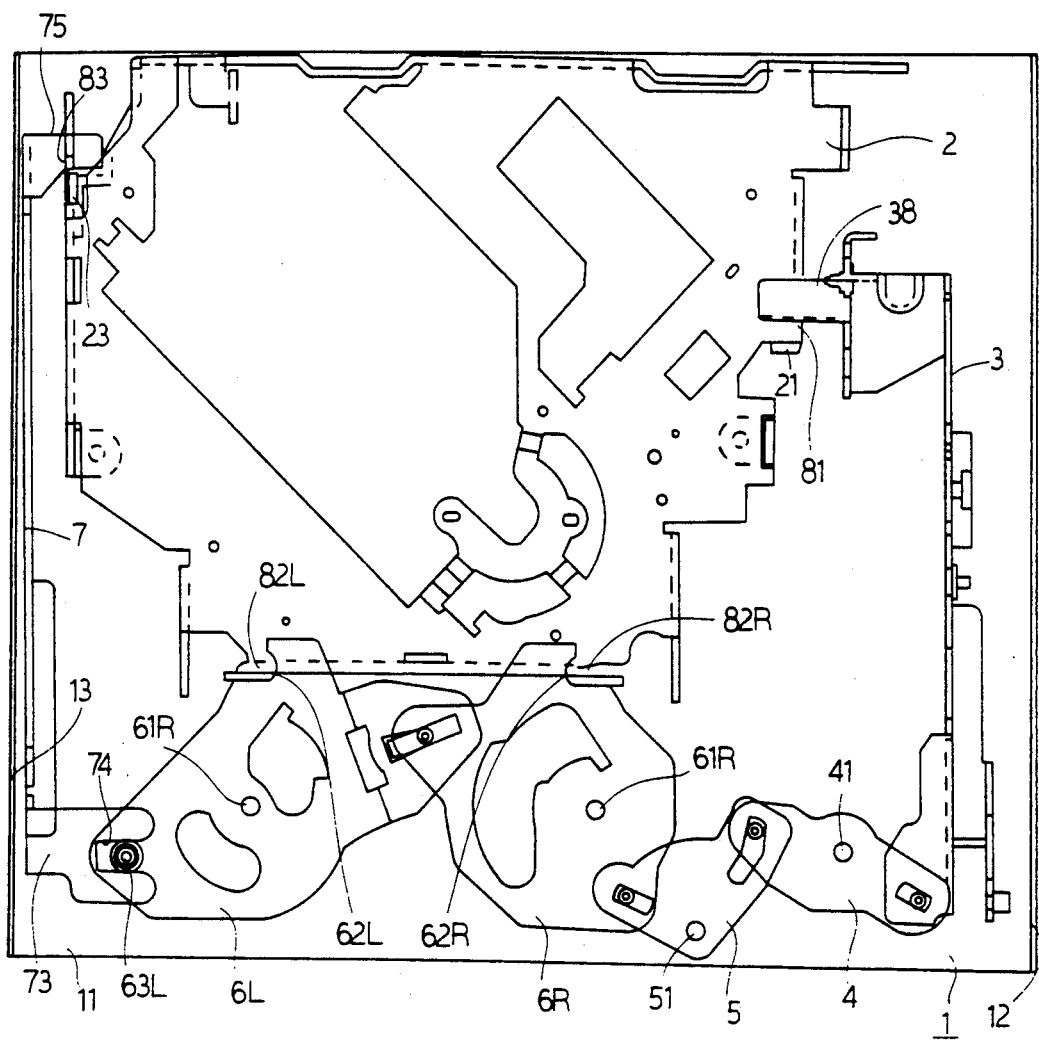

As shown in FIGS. 1 and 2, an upright plate member 22 is provided at the front of the floating unit 2. In the right and left sections of this plate member 22, there are provided second engaging parts 82R, 82L which engage second lock parts 62R, 62L, respectively. The right and left second engaging parts 82R, 82L have guide parts formed to face each other, and the second lock parts 62R, 62L engage the second engaging parts 82R, 82L from inside the chassis 1.

As shown in FIGS. 1 and 8, an upright plate member 23 is provided at the left-side rear part of the floating unit 2, and has an engaging part 83 which engages the third lock part 75.

In the respective lock parts 38, 62R, 62L, 75 and their respective engaging parts 81, 82R, 82L, 83, there are provided means for regulating their respective vertical movements. Each of such means comprises a plate member provided on each lock part and a slit provided in each engaging part. In other words, each engaging part comprises a guide part open laterally in a V-shape and a thin horizontal slit. The vertical-direction width of this guide part is far greater than the thickness of the lock part. Therefore, even when the floating unit 2 vibrates vertically, the lock parts never contact the guide parts. The vertical-direction width of the slit in each engaging part is substantially equal to the thickness of the plate member of each lock part, and therefore, even when the plate member moves back and forth in the slit, its movement in the vertical direction is limited.

The operation of this embodiment is as follows.

(1) Free state of the floating unit:

During playback of a CD, the locking mechanism of this embodiment is not working. Therefore, under this condition, the floating unit 2 is supported movably to the chassis 1 and through the intermediary of the damper means, so that the floating unit can vibrate freely in the chassis 1. As a result, the running vibration of the vehicle is not transmitted directly to the floating unit 2, the reproduction mechanism, etc. mounted on the floating section 2 are protected from impacts, and a sound-skip is prevented.

At this time, the shift plate 3 is positioned at the rear of the chassis 1, as shown in FIGS. 1, 5. Therefore, the first lock part 38 of the shift plate 3 is positioned in the guide part of the first engaging part 81 of the floating unit 2, so that the first lock part 38 and the first engaging part 81 do not come into contact with each other.

The right and left lock links 6R, 6L connected to the shift plate 3 have been moved to positions inside the chassis. Therefore, the second lock parts 62R, 62L of the right and left lock links 6R, 6L have been moved away from the second engaging parts 82R, 82L of the floating unit 2.

The lock plate 7 connected to the left lock link 6L is positioned behind the chassis 1. Therefore, the third lock part 75 of the lock plate 7 is in the guide part of the third engaging part 83 of the floating unit 2, so that those two parts do not come into contact with each other.

Consequently, the floating unit 2 is not locked by any lock part but is supported movably in the chassis 1.

At this time, the intermittent gear 35 for driving the shift plate 3 has the drive gear 36 engaging in the notch 37 thereof. Therefore, even when the motor rotates for playback of a CD and the drive gear 36 rotates, the intermittent gear 35 does not rotate, and the shift plate 3 does not rotate, either.

(2) The state of the floating unit in the course of being locked:

In order to load or eject a CD or put a CD into a waiting state from the playback state of the CD in the item (1), the floating unit 2 is secured to the chassis 1. Generally, this motion is done by inputting a reproduction stop signal to the CD player which is reproducing sound.

When a reproduction stop signal is input, the intermittent gear 35 rotates slightly and engages with the drive gear 36 by the motion of the electromagnetic plunger. Consequently, the torque of the drive gear 36 is transmitted to the intermittent gear 35, so that the intermittent gear 35 and the small gear 34 coaxial with the intermittent gear 35 rotate. As a result, the shift plate 3 having the rack 33 engaging with the pinion 34 moves forward (or downward in FIG. 1) relative to the chassis 1 in FIG. 1.

By the movement of this shift plate 3, the link mechanism connected to the front of the shift plate 3 also starts moving, and the lock links 6R, 6L also move toward the outside of the chassis 1. The lock plate 7 connected to the lock link 6L also moves downward relative to the chassis 1 in FIG. 1.

The lock parts 38, 62R, 62L, 75 move from the guide parts toward the thin slits of the engaging parts 81, 82R, 82L, 83. At this time, since the guide parts have the V-shape notch open laterally, the lock parts are guided along the sloped slit surfaces of the guide parts to easily get into the slits.

(3) The locked state of the floating unit:

As the shift plate 3 moves further and reaches the end of its stroke (stop position at the front end), all of the lock parts 38, 62R, 62L, 75 get into the corresponding slits in the engaging parts 81, 82R, 82L, 83. In this case, the lock parts take the form of a plate and have a thickness substantially equal to the width of the slit, and therefore, the lock parts do not move up or down in the slits. Therefore, the floating unit 2 is fixed to the chassis 1 in the vertical direction.

The edges of the first and third lock parts 38, 75 engage the front ends of the slits in the first and third engaging parts 81, 83 from the rear side of the chassis 1. Therefore, the floating unit 2 is prevented from moving toward the rear side. At this time, the front edges of the floating unit 2 impinge on parts of the right and left lock links 6R, 6L (the base positions of the right and left second engaging parts 82R, 82L), so that the floating unit 2 is prevented from moving forward. Instead of the floating unit 2 being caused to impinge on the parts of the right and left lock links, stops may be provided on the chassis side.

The right and left second lock parts 62R, 62L engage the right and left second engaging parts 82R, 82L from inside the chassis 1, so that the floating unit 2 is fixed so as not to be moved either in the left or right direction. At this time, in this embodiment, the right and left second lock parts 62R, 62L are formed in the circular arc, and therefore, the right and left second lock parts 62R, 62L turn to easily engage the right and left second engaging parts 82R, 82L.

As a result, the floating unit 2 is prevented from moving in all the front-rear, left-right, and vertical directions by the lock parts 38, 62R, 62L, 75 and is fixed to the chassis 1. Since the lock parts and the engaging parts are provided in the front, rear-left and rear-right of the floating unit 2, the floating unit 2 is securely fixed to the chassis at three position. Since the respective lock parts and engaging parts are provided spaced around the periphery of the floating unit, the floating unit is more securely fixed than when it is fixed by securing only a part of the floating unit in the form of a cantilever.

In consequence, the relative positional relationship between the chassis and the floating unit is maintained accurately, so that the CD can be inserted and ejected smoothly and accurately and that the CD is prevented from being damaged. In addition, the positional misalignment between the chassis and the floating unit that would otherwise occur when a CD is in the waiting state can be eliminated, so that damage to a CD is prevented.

The lock mechanism for a floating unit according to this invention is not limited to the above-mentioned embodiment. The number of links of the link mechanism may be selected when required, and may be one, for example. The dimensions and the shapes of the component members may be changed when required. The front-rear and left-right directions indicate the directions which are substantially perpendicular to each other in a horizontal direction, and they are relative terms. Therefore, it is possible to arrange for the first and third lock parts to regulate the position of the floating unit in the left-right direction and for the second lock part in the link mechanism to regulate the position of the floating unit in the front-rear direction. Furthermore, so long as the first and the third lock parts have the same direction of movement, it may be arranged that the first lock part moves forward and the third lock part moves backward for locking motions. The right and left second lock parts may be arranged to engage the left and right engaging parts from outside of the chassis by the link mechanism, and the number of second lock parts may be one.

What is claimed is:

1. A locking mechanism for a floating unit comprising:
   a chassis;
   a floating unit supported movably by said chassis through the intermediary of damper means;
   a shift plate provided on said chassis and being movable by a drive power of a motor;
   a link mechanism provided on said chassis and being capable of rotational movement by the movement of said shift plate;
   a lock plate provided on said chassis and being movable by said link mechanism;
   a first lock part provided on said shift plate and being movable in a first direction;
   a second lock part provided in said link mechanism and being movable in a second direction perpendicular to the first direction;
   a third lock part provided in said lock plate and being movable in the first direction;
   first, second and third engaging parts, provided in said floating unit for engaging said first, second and third lock parts respectively to limit the movement of said floating unit; and
   limiting means for limiting vertical movement of said floating unit, said limiting means being provided on at least one of combinations of the first, second and third lock parts with the corresponding first, second and third engaging parts.

2. A locking mechanism for a floating unit according to claim 1, wherein said shift plate is provided on one side of said floating unit movably in the front-rear direction, wherein said link mechanism is provided at the front of said floating unit movably in the left-right direction, and wherein said lock plate is provided movably on the opposite side of said floating unit from said shift plate.

3. A locking mechanism for a floating unit according to claim 2, wherein the first lock part of said shift plate and the first engaging part of said floating unit for engagement with the first lock part are provided on one side rear of said floating unit, and
   wherein the third lock part of said lock plate and the third engaging part of said floating unit for engagement with the third lock part are provided on the other side rear of said floating unit.

4. A locking mechanism for a floating unit according to claim 1, wherein said link mechanism includes a pair of lock links movable in opposite directions from each other, wherein each of said lock links includes a second lock part, and wherein said floating unit includes two second engaging parts with which said lock links engage.

5. A locking mechanism for a floating unit according to claim 1, wherein said vertical movement limiting means includes a horizontal plate member constituting said lock part and a thin horizontal slit for receiving said horizontal plate member.

6. A locking mechanism for a floating unit according to claim 1, wherein said locking mechanism comprises a chassis of a CD player and a floating unit provided in said CD player chassis and having a CD reproduction mechanism mounted thereon.

* * * * *